(12) United States Patent
Cohen

(10) Patent No.: US 11,025,449 B2
(45) Date of Patent: Jun. 1, 2021

(54) APPARATUS FOR PROTECTING A HOME APPLIANCE FROM FALSE ACTIVATION

(71) Applicant: Gavriel Cohen, Givat Shmuel (IL)

(72) Inventor: Gavriel Cohen, Givat Shmuel (IL)

(*) Notice: Subject to any disclaimer, the term of this patent is extended or adjusted under 35 U.S.C. 154(b) by 0 days.

(21) Appl. No.: 15/996,487

(22) Filed: Jun. 3, 2018

(65) Prior Publication Data
US 2019/0372800 A1 Dec. 5, 2019

(51) Int. Cl.
H04L 12/28 (2006.01)
H02H 11/00 (2006.01)

(52) U.S. Cl.
CPC ....... H04L 12/2821 (2013.01); H02H 11/007 (2013.01); H04L 12/2827 (2013.01)

(58) Field of Classification Search
CPC ............ H04L 12/2821; H04L 12/2827; H02H 11/007
USPC ......................................................... 700/298
See application file for complete search history.

(56) References Cited

U.S. PATENT DOCUMENTS

| | | | | |
|---|---|---|---|---|
| 6,066,837 A * | 5/2000 | McCormick | ............ | F24C 7/087 219/506 |
| 6,473,661 B1 * | 10/2002 | Wollner | ................. | G05B 15/02 700/17 |
| 2003/0066827 A1 * | 4/2003 | Daum | ..................... | F24C 7/082 219/492 |
| 2005/0109333 A1 * | 5/2005 | Thomas | ................... | F24C 7/082 126/42 |
| 2010/0188916 A1 * | 7/2010 | Fox | ..................... | H03K 19/0005 365/226 |
| 2012/0038478 A1 * | 2/2012 | Haviv | ..................... | E05B 17/22 340/540 |
| 2012/0181266 A1 * | 7/2012 | Frommer | .................. | F24C 3/12 219/492 |
| 2014/0025219 A1 * | 1/2014 | Broniak | .................. | F24C 7/082 700/296 |
| 2014/0166447 A1 * | 6/2014 | Thea | ................... | H05B 37/0281 200/19.01 |
| 2014/0291483 A1 * | 10/2014 | Yamada | ................... | H04N 5/32 250/208.1 |

* cited by examiner

Primary Examiner — Jigneshkumar C Patel

(57) ABSTRACT

Home appliances have operation switches and buttons and also sensors which can be activated by the user. It is possible that the user will cause and an undesired operation to take place by pressing a switch or activating a sensor by a certain action. This can be small children of dementing old people left alone, or any person in the household which can do things by mistake. This invention will describe an apparatus serving as an appliance accessory which can force the voltage value at the appropriate timing and time frame to be put on the appropriate control lines coming in the appliance control board thus maintaining a proper appliance operation.

7 Claims, 2 Drawing Sheets

APPARATUS FOR PROTECTING A HOME APPLIANCE FROM FALSE ACTIVATION

FIELD OF THE INVENTION

The invention generally relates to the operation of home appliances.

BACKGROUND

There are many home appliances today. Typically they all have switches to turn them on and off and also switches and buttons to change the mode of operation an appliance operation. A refrigerator has such switches to change its operation temperature and an air conditioner has such a switch to choose between heating and cooling. There are appliance sensors which detect when a door is opened or a press is made by a person. Small children or elderly dementing people left alone may press a switch or open a door by mistake. Also all other people may do such an action like turning on the heater in the summer time by mistake.

For religious Jews there is a specific problem—they are not allowed to do any action which will cause an electric activity during the Sabbath.

Two Israeli patent 236214 and 223236 are offering solutions. 236214 is describing a system where using software control false activations will be disregarded and 223236 describes a system where using switches/relays.

However, both require intervening with existing appliances where the needs may not be justified.

SUMMARY OF THE INVENTION

The invention is about having an apparatus which is serving as an accessory to the appliance which can force on the control lines coming from the appliance switches and sensors and going in the appliance control board a desired voltage value, regardless of the values put by the appliance switches or sensors. This can be done without any switches/relays by using low impedance drivers. The driving will be done at a specific timing and will be kept for a certain time frame this can be a specific date and time of the day and a duration of days, hours and minutes. The forced value can be a known desired value or the sampled value at the beginning of a time frame. The timing can be controlled by a remote controller, which will allow easy control of the lines to be forces and the timing.

DETAILED DESCRIPTION

Figure 1:
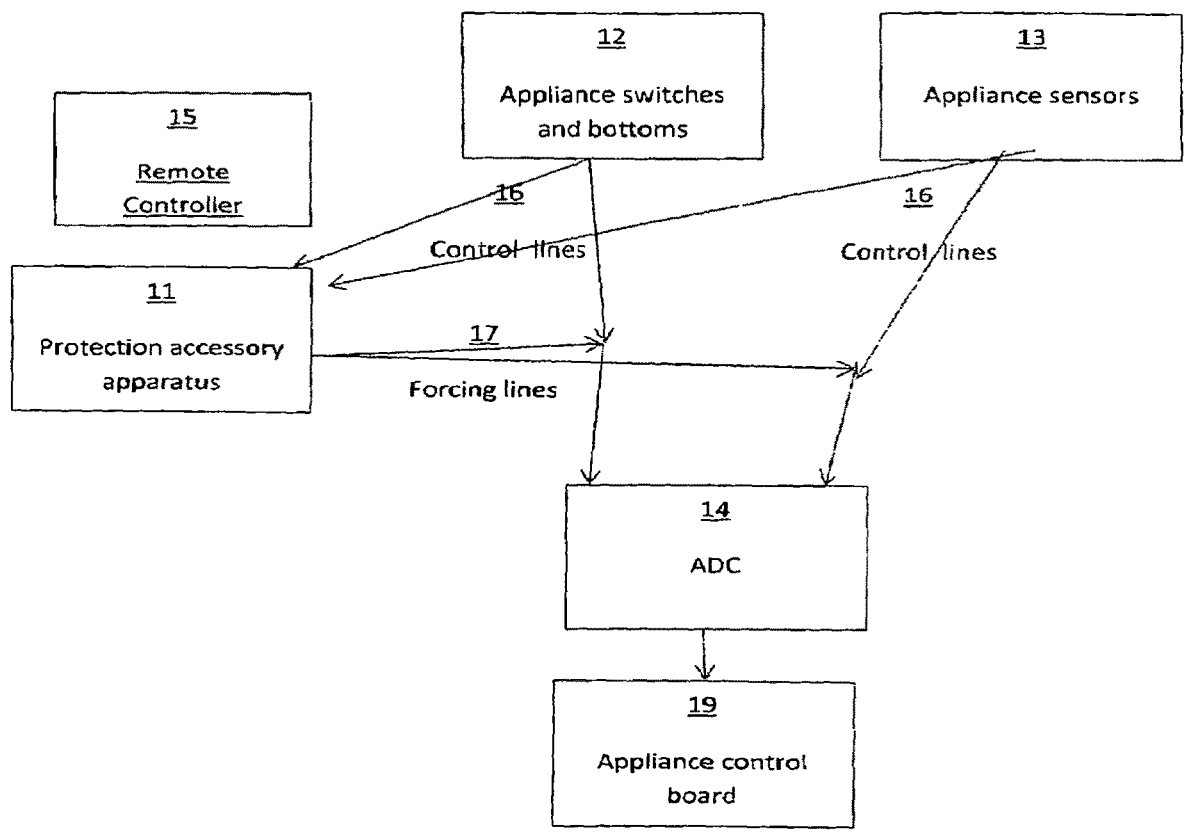
FIG. 1 is a description of the full system with the appliance and the accessory apparatus.

FIG. 1 is the system description. Without the new invention the control lines 16 coming out of the appliance switches and buttons 12 and sensor 13 would go directly to ADC 14 and from there to the appliance control board 19.

Under the new invention, Protection accessory apparatus 11 will receive these control lines and would output forcing lines 17 with appropriate e values. They will join the control lines 16 going to the appliance control board. This will force the control lines 16 to receive the voltage values coming from the apparatus instead of the values coning from sensor/switches and the lines coming in ADC 14 will have the values coming from the apparatus 21 and not from switches 12 or sensors 13, this is during the period of time the apparatus is driving the lines.

Figure 2:
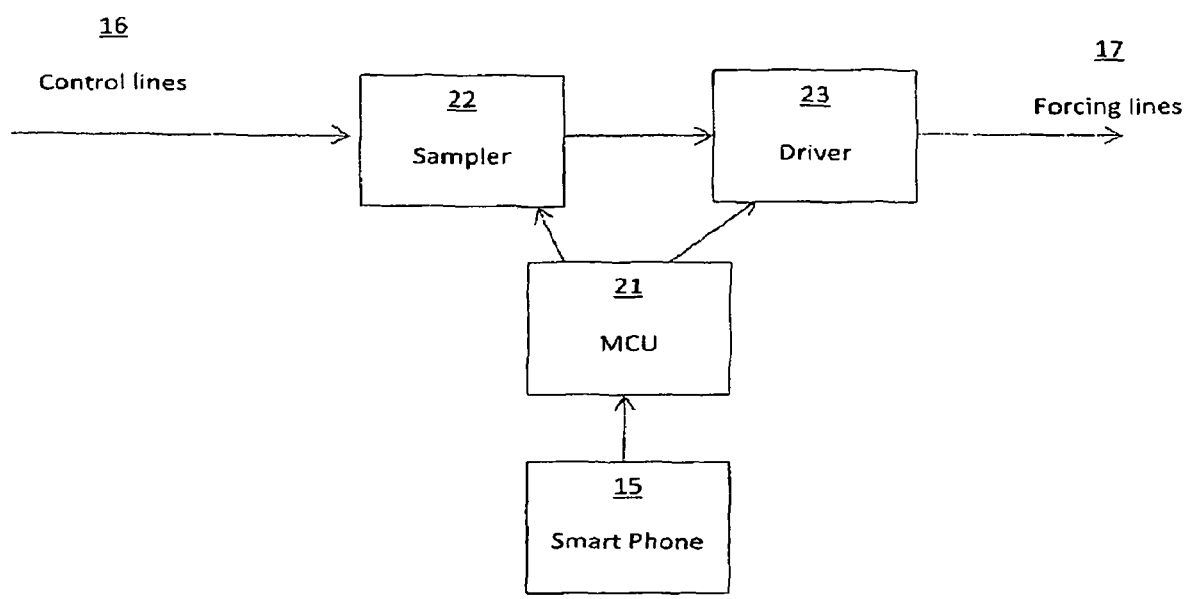
FIG. 2 is a description of the protection accessory apparatus.

FIG. 2 shows the apparatus in details it has control lines 16 samplers, a sampler 22 per line and voltage drivers/amplifiers 23—one per line. Both are under the control of MCU 21 which is under the control of Smart phone 15 via Bluetooth. It is possible that the MCU is aware of the desired value per line and will instruct the driver to drive it. It is also possible that it is desired to maintain the status of the appliance at the beginning of the forcing operation, such that a sampling by sampler 22 will be done at the beginning of a time frame and this value will be forced on the lines. The driver/amplifier will force the voltage value by having a very low impedance/high amplification on forcing lines 17, which means that the voltage value on the control lines 16 to the ADC will be very close to that of the forcing lines. The impedance difference between the original lines and the apparatus will be big (e.g. at least 10×)

The impact of a selected time frame is that sampling will be done at the beginning of it and driving line with this value though the time frame.

The timing can be pre-programmed per appliance usage—e.g. Jewish Sabbath and holiday time or summer time. Or this can be a switch the mother is pressing when she leaves home. Potentially, this can be put under the control of a remote controller, which can be a smart phone with an application, any home computing device, Internet communication or any device with a wireless communication which can have an appliance control application, which will select the switches/sensors it wishes to control and under what timing and time frame.

The advantage of the described invention is that the installation inside an appliance is very easy. The apparatus will have to be packaged as an accessory in the appliance or close to it with wiring to it.

What is claimed is:

1. An apparatus serving as an accessory to a home appliance with sensors and switches comprising input control lines coming from a home appliance, a sampler per control line, an MCU (Micro Controller Unit), a driver/amplifier per control line and forcing lines outputs to the appliance where the apparatus can force a desired value of voltage on each of the forcing lines thus forcing connected control lines coming out of the appliance sensors and switches to a desired value.

2. The apparatus of claim 1, wherein the said forcing is done at a specific timing for a specific time frame.

3. The apparatus of claim 2, wherein the said timing and time frame are set by the house hold members.

4. The apparatus of claim 3, where the identity of the sensors/switches to be forced and/or the timing and time frame can be set by a remote controller.

5. The apparatus of claim 3, where the identity of the sensors/switches to be forced and/or the timing and time frame can be set by using switches/buttons.

6. The apparatus of claim 2, wherein the said timing and time frame are Jewish Sabbath and holidays.

7. The apparatus of claim 1, wherein the said value of the voltage to be forced is the value sampled on the control lines at the beginning of a time frame.

* * * * *